J. REUTHER & L. SCHULZ.
WEIGHING APPARATUS.
APPLICATION FILED APR. 12, 1909.

931,800.

Patented Aug. 24, 1909.

Witnesses
Phil E. Barnes
J. J. Sheehy Jr.

Inventors
Joseph Reuther
Louis Schulz
By James Sheehy
Attorney

UNITED STATES PATENT OFFICE.

JOSEPH REUTHER AND LOUIS SCHULZ, OF NEW ORLEANS, LOUISIANA.

WEIGHING APPARATUS.

931,800.  Specification of Letters Patent.  Patented Aug. 24, 1909.

Application filed April 12, 1909. Serial No. 489,281.

*To all whom it may concern:*

Be it known that we, JOSEPH REUTHER and LOUIS SCHULZ, citizens of the United States, residing at New Orleans, in the parish of Orleans and State of Louisiana, have invented new and useful Improvements in Weighing Apparatus, of which the following is a specification.

Our present invention has to do with weighing apparatus; and it contemplates the provision of an electrically-controlled weighing apparatus, of simple and inexpensive construction, and one possessed of large capacity, and susceptible of being easily adjusted and operated by unskilled attendants, and well adapted to withstand the rough usage to which weighing apparatus is ordinarily subjected.

Figure 1:
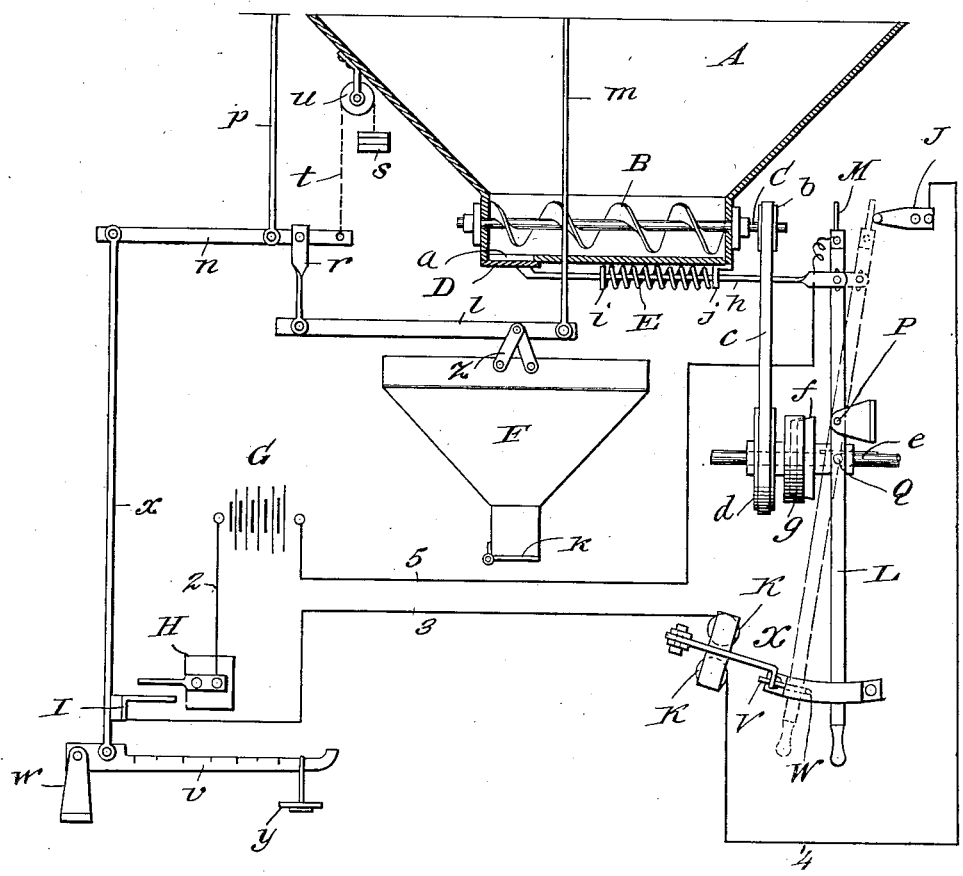
Figure 2:
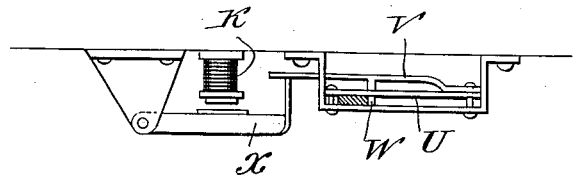

With the foregoing in view the invention will be fully understood from the following description and claims when the same are read in connection with the drawings, accompanying and forming part of this specification, in which:

Figure 1 is a view, partly in elevation and partly in vertical section, of the apparatus constituting the best practical embodiment of our invention that we have as yet devised. Fig. 2 is an enlarged, detail section, taken at a right angle to Fig. 1 and illustrating the means for retaining the lever in the position in which the same is placed to put the apparatus in operation.

Similar characters designate corresponding parts in both views of the drawings, referring to which:

A is the bottom portion of a bin or receptacle, designed to contain the material to be weighed. The said bin is provided in its bottom with a discharge opening $a$, and is equipped in its lower portion with a screw conveyer B for moving the material to and assuring the quick passage of the same through the opening $a$. The said screw conveyer B is carried by a shaft C which extends outside the bin and is there provided with a band pulley $b$. This latter is connected through a band $c$ with a band pulley $d$ loose on a shaft $e$, designed to be rotated by any suitable motor or other means (not shown), and splined or otherwise arranged on said shaft $e$ so as to turn therewith and be capable of endwise movement thereon is the male member $f$ of a friction clutch, the female member $g$ of which is fixed with respect to the pulley $d$. Thus it will be manifest that when the member $f$ is pressed into engagement with the pulley $d$, the said pulley $d$ will turn with the shaft $e$ and rotary motion will be transmitted to the conveyer B for the purpose stated.

D is a valve or gate designed to control the discharge opening $a$ of bin A and having a stem $h$. E is a coiled spring surrounding the said stem $h$ and interposed between an abutment $i$ thereon and a fixed abutment $j$, and F is a receptacle positioned to receive material from the opening $a$ of the bin and having a valved or other suitable discharge $k$. The said receptacle F is connected with a standard or conventional scale made up of a lever $l$ fulcrumed on a hanger rod $m$, a lever $n$ fulcrumed on a hanger rod $p$, a link $r$ interposed between and connected to the levers $l$ and $p$, a counter-balance weight $s$ connected with the lever $n$ by a cable $t$ passed over a sheave $u$, a scale beam $v$ suitably supported at $w$ and connected through a rod $x$ with the lever $n$, and a weight $y$ adjustably arranged on said beam $v$. The receptacle F is preferably connected through links $z$ with the lever $l$ of the series comprised in the scale, and at this point we desire to state that while we prefer to employ the scale illustrated, we do not confine ourselves to the employment of same, inasmuch as any other scale compatible with the purpose of our invention may be employed without involving departure from the scope of the invention as defined in the claims appended.

G, Fig. 1, is a source of electric energy.

H is a stationary terminal connected through a wire 2 with the positive pole of the source of energy G.

I is a terminal connected with but electrically isolated from the scale beam $v$.

J is a second stationary terminal.

K K are electro-magnets.

3 is a wire extending between and electrically connecting the movable terminal or contact piece I and the helix of one of the connected magnets K. 4 is a wire electrically connecting the helix of the other magnet K and the stationary contact piece J.

L is a lever carrying an electric terminal or contact piece M, and 5 is a wire extending between and electrically connecting the minus pole of the source of energy G and the terminal M.

By virtue of the provision of the electric devices and connections described, it will be manifest that when the lever L is in the position shown by dotted lines in Fig. 1, and the terminal I is raised into contact with the terminal H, the electric circuit will be complete and current will pass from the plus pole of the source of energy G through the wire 2, the terminal H, the terminal I, the wire 3, the electro-magnets K, the wire 4, the terminal J, the terminal M, and the wire 5, in the order named to the minus pole of the source of energy G for a purpose hereinafter set forth.

The lever L is fulcrumed at P on a suitable support and is provided with projections Q disposed in a circumferential groove of the friction clutch member f, whereby it will be manifest that while the lever may be used to shift the member f endwise it will not interfere with the rotation of the member. The upper arm of the said lever L is connected with the stem h of the valve or gate D, and the lower arm of the lever is arranged and movable in a guide U, best shown in Fig. 2. Connected at one end to the back wall of the guide U, which is set out from its support, is a spring strip V having a stud W which works through an aperture in said back wall and is adapted to normally rest in the position shown in Fig. 2. It will also be seen by reference to Fig. 2 that the spring strip V is extended beyond one end of the guide U and is adapted to be moved through the medium of an armature X complementary to the before described magnets K.

In the practical use of our novel apparatus it will be seen that when it is desired to load the receptacle F with 100 pounds of material, for instance, the weight y is positioned at the proper point on the scale beam v, and the lever L is thrown from the position shown by full lines in Fig. 1 to that shown by dotted lines. Manifestly the said movement of lever L will carry the lower arm thereof past the stud or projection W of the spring strip V, while the upper arm of the lever will operate to move the terminal M against the terminal J and also to open the valve or gate D against the action of the spring E. It will further be noted that said movement of the lever L will put the friction clutch member f into engagement with the complementary member g, with the result that the screw conveyer B will be put in motion and the material in the bin A will be caused to quickly pass through the discharge opening a and into the receptacle F. Then when the 100 pounds of material is discharged into the receptacle F, the said receptacle will move downwardly, and through the levers and connections described, will raise the scale beam v, whereupon the terminal I will contact with the terminal H to complete the electric circuit and enable the current to take the passage hereinbefore described in detail. Such passage of the current will effect the energization of the magnets K and the consequent attraction of the armature X to the magnets, and the armature in turn will press the spring strip V back sufficiently far to enable the lever L to clear the projection W, whereupon the spring E, compressed by the opening of the valve or gate D, will expand and by so doing will quickly close the valve D and pull the lever L back into the position shown by full lines in Fig. 1. It will also be understood that the restoration of the lever L to the position shown by full lines in Fig. 1 will operate to disengage the clutch member f from the member G and stop the conveyer B.

In order to enable the lever L to pass the stud or projection W of spring V when said lever is moved to the position shown by dotted lines in Fig. 1 and by full lines in Fig. 2, the end of the said stud or projection W is beveled in the proper direction.

It will be gathered from the foregoing that our novel apparatus is simple and inexpensive and durable, and that it may be operated to advantage without the employment of skilled labor.

As before stated, the apparatus herein illustrated and described constitutes the best practical embodiment of our invention of which we are cognizant, but it is obvious that in the future practice of the invention such changes in the form, construction and relative arrangement of parts may be made as fairly fall within the scope of our invention as defined in the claims appended. For instance while we illustrate and describe a screw conveyer B for facilitating the passage of the material to be weighed to the discharge opening a of the bin, we do not desire to be understood as limiting ourselves to the screw type of conveyer, inasmuch as a conveyer of any other type may be employed, and when deemed expedient the conveyer and the parts appurtenant thereto may be altogether omitted without affecting our invention as set forth in some of our claims.

Having described our invention, what we claim and desire to secure by Letters-Patent, is:

1. An electrically-controlled weighing apparatus, comprising a bin having a discharge opening in its bottom, a screw conveyer arranged in the lower portion of the bin, a valve for closing the said opening, a spring normally holding said valve in a closed position, a scale having a beam, a receptacle connected and movable with the scale beam and arranged to receive material from the discharge opening of the bin, stationary terminals arranged in a normally open circuit with a source of electric energy, a terminal movable with the scale beam and into and out of contact with one of said stationary terminals and also arranged in said circuit, an electromagnet also arranged in the circuit, an armature complementary to the magnet, a guide, a resilient strip arranged to be moved in one direction by the armature and having a projection extending into the guide, a shaft, a driving connection intermediate the shaft and the conveyer and formed in part by a friction clutch, a lever movable in the guide and connected and movable with one of the members of the friction clutch and connected with the valve, and a terminal carried by the lever and arranged in the said circuit and movable into and out of contact with the other stationary terminal.

2. An electrically-controlled weighing apparatus, comprising a bin having a discharge opening in its bottom, a valve for closing the said opening, a spring normally holding said valve in a closed position, a scale having a beam, a receptacle connected and movable with the scale beam and arranged to receive material from the discharge opening of the bin, stationary terminals arranged in a normally open circuit with a source of electric energy, a terminal movable with the scale beam and into and out of contact with one of said stationary terminals and also arranged in said circuit, an electro-magnet also arranged in the circuit, an armature complementary to the magnet, a guide, a resilient strip arranged to be moved in one direction by the armature and having a projection extending into the guide, a lever movable in the guide and connected with the valve, and a terminal carried by the lever and arranged in the said circuit and movable into and out of contact with the other stationary terminal.

3. An electrically-controlled weighing apparatus, comprising a bin having a discharge opening, a valve controlling said opening, a spring for moving the valve to and normally holding the same in a closed position, a scale, means connected and movable with the scale and positioned to receive material from said discharge opening, movable means for opening the valve against the action of the spring, a terminal movable with said means and arranged in a normally open circuit with a source of electric energy, a terminal complementary to the first named terminal and also arranged in said circuit, electric means arranged in the circuit and adapted when the same is completed to release said movable means, and a terminal movable with the scale and a terminal complementary to said movable terminal, both arranged in the electric circuit.

In testimony whereof we have hereunto set our hands in presence of two subscribing witnesses.

JOSEPH REUTHER.
LOUIS SCHULZ.

Witnesses:
SCOTT E. BEER,
JOHN WAY MERRET.